United States Patent [19]

Fraser

[11] Patent Number: 4,866,828

[45] Date of Patent: Sep. 19, 1989

[54] METHOD OF REPAIRING TURBINE BLADES

[75] Inventor: Michael J. Fraser, Birmingham, United Kingdom

[73] Assignee: Refurbished Turbine Components Limited, Hereford and Worcester, England

[21] Appl. No.: 618,318

[22] Filed: Jun. 8, 1984

Related U.S. Application Data

[63] Continuation of Ser. No. 338,298, Jan. 11, 1982, abandoned.

[30] Foreign Application Priority Data

Jan. 12, 1981 [GB] United Kingdom ................ 8100780

[51] Int. Cl.$^4$ ............................................. B23P 15/02
[52] U.S. Cl. ............................. 29/156.8 B; 29/402.18; 29/402.21; 416/224
[58] Field of Search .................. 29/156.8 B, 402.18, 29/402.19, 402.07, 402.13, 402.21; 228/119; 416/224, 194 R, 196 R, 500

[56] References Cited

U.S. PATENT DOCUMENTS

| | | | |
|---|---|---|---|
| 1,751,570 | 3/1930 | Allen | 416/196 R |
| 2,632,944 | 3/1953 | Kittelson | 228/119 |
| 3,449,816 | 6/1969 | Swick et al. | 228/119 |
| 3,528,200 | 9/1970 | Allen et al. | 29/402.19 |
| 3,564,689 | 2/1971 | Hirtenlechner | 416/224 |
| 3,660,882 | 5/1972 | Widowitz et al. | 416/224 |
| 4,028,787 | 6/1977 | Cretella et al. | 228/119 |

FOREIGN PATENT DOCUMENTS

| | | | |
|---|---|---|---|
| 2054549 | 5/1972 | Fed. Rep. of Germany | 29/156.8 B |
| 309235 | 4/1929 | United Kingdom | 416/224 |
| 1233730 | 5/1971 | United Kingdom | 29/156.8 R |

OTHER PUBLICATIONS

Oates, J. A., *Modern Welding Practice*, vol. II, Caxton Publishing Co., London, TT 21103 1958, pp. 298, 299.

*Primary Examiner*—Daniel C. Crane
*Attorney, Agent, or Firm*—Parmelee, Miller, Welsh & Kratz

[57] ABSTRACT

A method of repairing a turbine blade of the type having one or more lacing wire holes comprising the steps of welding additional metal to the blade, subjecting the blade to a stress relieving heat treatment process before which the or each lacing wire hole is effectively eliminated by filling the hole or holes with material the same as or at least compatible with the material from which the blade is made. The turbine blade may be subjected to the application of mechanical forces to restore its form and machining to restore its shape can be gauged to ensure both its form and shape is correct.

8 Claims, 4 Drawing Sheets

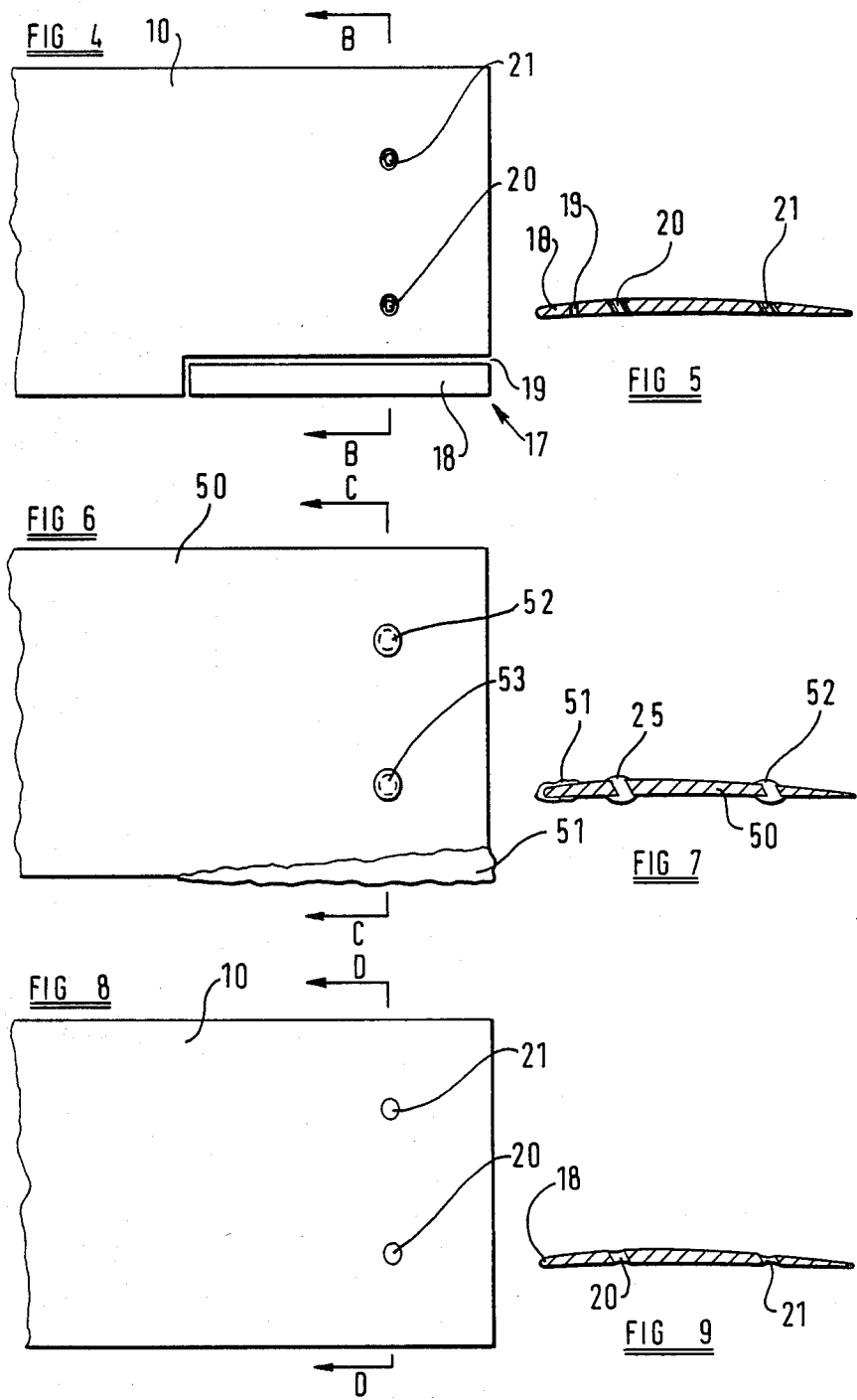

METHOD OF REPAIRING TURBINE BLADES

This application is a continuation of application Ser. No. 338,295, filed Jan. 11, 1982, now abandoned.

BACKGROUND OF THE INVENTION

Field of the Invention

The present invention relates to a method of repairing turbine blades.

Repairing turbine blades by welding is in some cases a highly satisfactory method of effecting a repair and is considerably cheaper than total replacement of the blade.

It has been found however that the repair of some turbine blades by methods using a welding process is not satisfactory since even though from visual inspection the repair appears satisfactory, problems can still arise because turbine blades are in use subjected to consider-able forces.

The type of turbine blade assembly, which may comprise a rotor or a stator, in which a repair by welding has been found to be not satisfactory is that in which adjacent blades are interconnected, usually in the region of their outer ends by snubbers, lacing wires or other members requiring a hole or other discontinuity to be formed in the turbine blade (all such members being hereinafter referred to for convenience as lacing wires and the discontinuities as lacing wire holes). The purpose of the lacing wires is to prevent excessive relative movement between the blades and to generally dampen any vibration during operation of the turbine. Such lacing wires therefore render the turbine structure more rigid but do not prevent all relative movement between the blades.

Since the outer end of the turbine blade in a rotor assembly is the part which has the greatest linear speed in use, it is the outer end that is most prone to erosion. Erosion generally occurs because of contact between the turbine blades with particles carried by the steam and also with the steam itself.

At the high pressure end of a steam turbine for example, the blades are generally subjected to damage from particles of solid matter carried by the steam due to contact between the blades and the particles, and since the rate of erosion will be dependant on relative speeds between the blades and particles, it is generally the leading edge at the outer end of each blade that is most prone to erosion by impact between the particles and said edges.

At the low pressure end of the turbine, the steam is at a lower temperature having been cooled during passage through the turbine and water condenses therefrom more readily. The steam is therefore wetter and the transfer of energy by impact on the turbine blade of the steam itself is greater at the low pressure end of the turbine than that at the high pressure end. Here again it is predominantly the outer ends of the blades which are especially subject to erosion.

It is known to form the leading edge at the outer end of the turbine blade as an insert from a different material from that used for the remainder of the blade. Turbine blades are often made from a chrome steel and the insert may be made from stellite or a suitable hardened steel, in which case the insert may be brazed to the blade. If the blade has not originally been formed with such an insert and is subsequently required to be repaired, the turbine blade may then have such an insert introduced. In which case, the insert may be secured to the remainder of the turbine blade by a welding process, the blade end being subsequently machined to restore it to its original form.

Such a method of repairing turbine blades has been found to be successful only in the case where the turbine blade is a uniform or homogeneous structure and, in the case of turbine blades having discontinuities such as lacing wire holes, then even though the welded repair may have the appearance of being satisfactory, in use such blades are prone to "stress corrosion cracking" which leads to a short and hence unacceptable life after repair.

SUMMARY OF THE INVENTION

It is an object of the present invention to provide a method of repairing turbine blades of the type having lacing wire holes, which method enables a welding process to be used satisfactorily.

According to the present invention, we provide a method of repairing a turbine blade of the type having one or more lacing wire holes, the method comprising the steps of:

(a) welding additional metal to a part of the blade requiring repair;

(b) eliminating the or each lacing wire hole by filling the hole or holes with material the same as or at least compatible with the material from which the blade is made;

(c) subjecting the blade to a stress relieving heat treatment process to relieve residual stress in the blade;

(d) machining the repaired area of the blade to return it to its original shape.

The filing of the lacing wire holes may be effected at any stage of the repairing method prior to heat treatment process and, is preferably carried out at the same time as the addition of metal by welding.

Machining of the blade may be carried out before or after the heat treatment process provided the machining does not generate heat in sufficient quantities to bring about residual stress in the turbine blade.

It may be that during the addition of metal by welding during the method of repairing thr turbine blade, distortion of the blade will occur, and the blade may therefore after the addition of metal be subjected to mechanical forces to return the blade to its original shape. Said subjecting of the blade to mechanical forces preferably takes place before said heat treatment process such that the heat treatment is effective to eliminate any stress in the turbine blade and is preferably carried out after filling of the lacing wire holes in order to eliminate the possibility of causing damage in the region of the lacing wire holes by the application of mechanical forces.

It is essential that the turbine blade is returned to its original shape and form and to ensure that the repaired article is exactly the shape and form required, preferably a gauging step is included in said method.

One reason for the need to fill and subsequently re-form the lacing wire holes is believed to be that even though the lacing wire holes may not be in an area which is eroded and hence in an area which as such is in need of repair, the heating and consequent stressing of the turbine blade caused by the repair in other adjacent areas, and subsequent heat treatment and possible mechanical stressing, affects the structure of the material in the vicinity of or around the lacing wire holes and thus increases the risk of crack formation leading to subsequent failure of the turbine blade.

It is further believed that the phenomenon of "stress corrosion cracking" occurring in use around the lacing wire holes may be due to concentration of residual stress in the region of the lacing wire holes during application of mechanical forces to the turbine blade, it being necessary to maintain or return the blade to its correct shape after repair.

Preferably therefore, where substantial mechanical forces have been applied to the turbine blade to return the blade to its correct form during repair, the lacing wire holes will have been filled prior to the application of such mechanical forces.

The lacing wire holes may be filled by introduction of the welding metal itself or introduction of a new piece of solid state material welded into the hole. In both cases the lacing wire holes will be filled at least before heat treatment.

BRIEF DESCRIPTION OF THE DRAWINGS

The invention will now be described in more detail by way of example only with reference to the accompanying drawings wherein:

FIG. 4 illustrates a welding process being used to repair a turbine blade;

FIG. 5 is a cross-section along the line B—B shown in FIG. 4;

FIG. 6 illustrates an alternative repair involving by a welding process;

FIG. 7 is a cross-section along the line C—C shown in FIG. 6;

FIG. 8 illustrates a repaired turbine blade;

FIG. 9 is a cross-section along the line D—D shown in FIG. 8;

DESCRIPTION OF THE PREFERRED EMBODIMENTS

Figure 1:
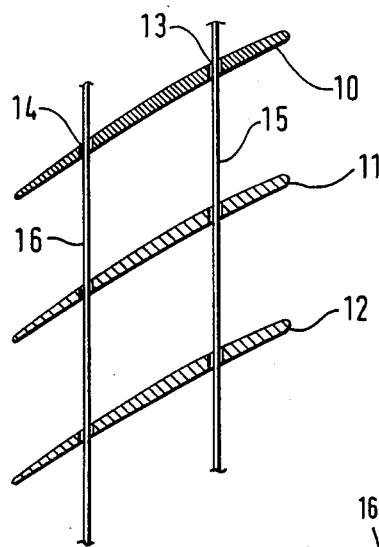
FIG. 1 is a cross-sectional view looking radially inwardly of three turbine blades interconnected by lacing wires.
Figure 1A:
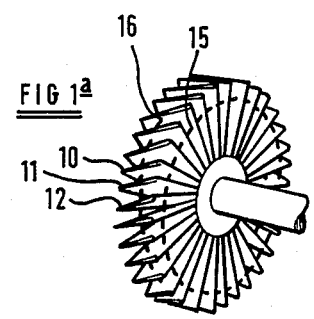
FIG. 1A is a prespective view of a complete turbine rotor.

Referring first to FIGS. 1 and 1A, three turbine blades are shown 10, 11 and 12, each turbine blade having through bores 13 and 14 through which pass respective lacing wires 15 and 16.

The lacing wires 15 and 16 can pass either with clearance through their respective through bores 13 and 14 in the turbine blades, or may be joined to each turbine blade by welding for example.

If the lacing wires pass freely through the through bores 13 and 14 in use of the turbine, the radially outwardly directed centrifugal force on the lacing wires between adjacent turbine blades will cause pressure contact between the lacing wires and the turbine blades, such pressure contact being sufficient to provide the required restriction of relative movement between adjacent turbine blades.

FIG. 1A illustrates an example of a rotor from a turbine, the three turbine blades 10, 11 and 12 shown in FIG. 1 being three of a considerable number of blades forming the complete array in the rotor.

The turbine blades, such as those shown at 10, 11, 12, can be made from a variety of materials depending on the function and operating conditions of the turbine. A typical material from which a blade in a steam turbine may be manufactured is chrome steel being approximately 12% chrome.

Figure 2:
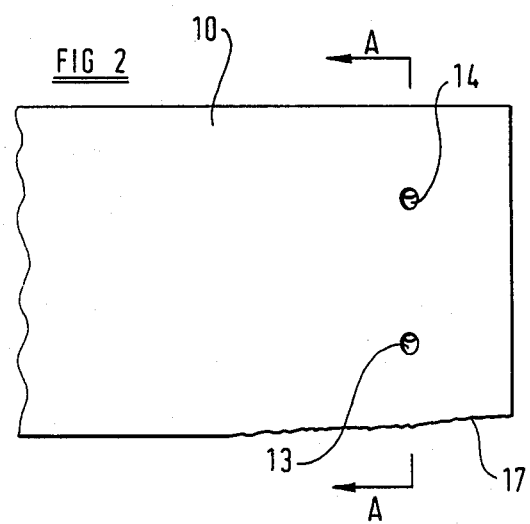
FIG. 2 is a view of an end of an end region of the turbine blade illustrating the area where erosion is most common.

Referring now to FIG. 2, the area of the turbine blade which is most prone to erosion is illustrated, this being the leading edge 17 of the outer end of the turbine blade since it is this part of the blade which "collides" with the steam or particles carried thereby during use of the turbine, and which also has the greatest linear speed being the radially outermost point from the axis of rotation. The leading edge 17 is the edge which is nearest the steam inlet end of the turbine.

Figure 3:
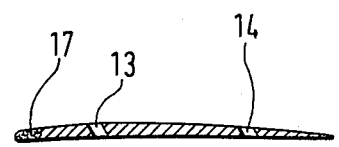
FIG. 3 is a cross-section of the turbine blade taken along the line A—A shown in FIG. 2.

FIG. 3 illustrates the area where erosion is most likely to occur on the leading edge 17 of the turbine blade 10, and which erosion even though it may be severe, is not normally so extensive as to reach as far as the nearest lacing hole 13.

Referring now to FIGS. 4 to 11, a method of repairing the turbine blade in accordance with the invention will now be described.

A piece of material is cut out from the margin bordering leading edge 17 and a new piece 18 of hard material, such as Stellite, is welded to the remainder of the turbine blade 10. The material used for welding is one compatible with the material from which the blade is made, for example, chrome steel and the material, i.e. Stellite, which is to be welded to the turbine blade 10.

The lacing wire holes 13 and 14 are filled by welding in plugs 20 and 21 which may well be of the same material from which the turbine blade is made, and once again a compatible welding metal will be used.

In FIGS. 6 and 7 an alternative repair is shown in which the turbine blade 50 has the leading outer edge region 57 repaired by the addition of fused metal by a welding process. The lacing wire holes 52 and 53 are likewise filled with fused metal. The method of repair then continues in an identical manner as that described for the blade 10 shown in FIGS. 4 and 5.

All eroded material now having been replaced, the excess material may at this stage be machined to restore the blade to its proper shape or provided that the machining does not unduly raise the temperature of the turbine blade, the machining can be carried out at a later stage in the repair process.

If the turbine blade 10 has not significantly altered its form, then the next stage in the repair process is to heat the blade to a predetermined temperature to relieve any residual stress in the blade.

Figure 11:
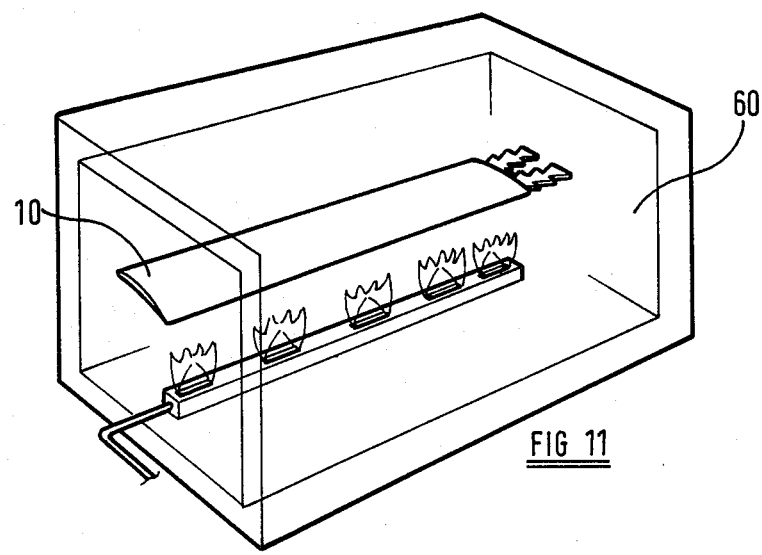
FIG. 11 is a schematic view illustrating the turbine blade in a furnace or heat treatment.

Referring to FIG. 11, the heat treatment may be carried out in any suitable oven 60, the temperature to which the blade is heated and the time to which it is subjected to such heat, depending on the size of the turbine blade and the material from which it is made. A typical heat treatment for a blade made from a 12% chrome steel being 1 hour at 660° C.

It is quite common that folowing removal of part of the blade as shown in FIGS. 4 and welding in of the new piece 18 of hard material such as Stellite, the form of the blade can be altered by distortion, which form must be connected prior to heat treatment.

Figure 10:
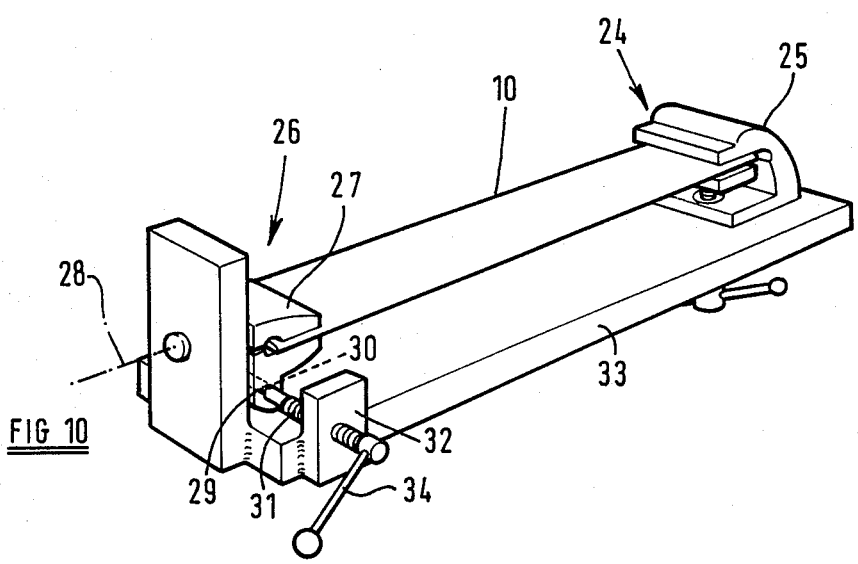
FIG. 10 is a view of a turbine blade in an apparatus to subject the blade to mechanical forces in order to return it to its required form.

The form of the blade involves causing a twisting of the blade between its ends and a simple apparatus for carrying out such twisting is illustrated in FIG. 10.

The root end 24 is held in a vice 25 and the other end 26 is held in a second vice 27 which is pivotally mounted about an axis 28. The vice 27 carries a lever arm 29 having a helically threaded through bore 30 into which extends a helically threaded member 31, which also extends through a helically threaded nut part 32 secured to base member 33. The helically threaded member 31 is provided with a handle 34 by means of which the helically threaded member 31 may be rotated causing pivotal movement of the second vice 26. Since the root end 24 of the turbine blade 10 is held in the vice 25, the turbine blade 10 will be twisted about its longitudinal axis and sufficient mechanical force is used to twist the turbine blade 10 until it has the correct form after having been released from the vices 25 and 27.

It may sometimes be necessary to cause twisting of the turbine blade 10 at localised positions intermediate its ends 24 and 36. A modified apparatus may be provided in which the vices 25 and 27 are movable towards and away from each other along an axis parallel with the turbine blade longitudinally, thereby enabling the blade 10 to be gripped at any two positions along its length.

Figure 12:
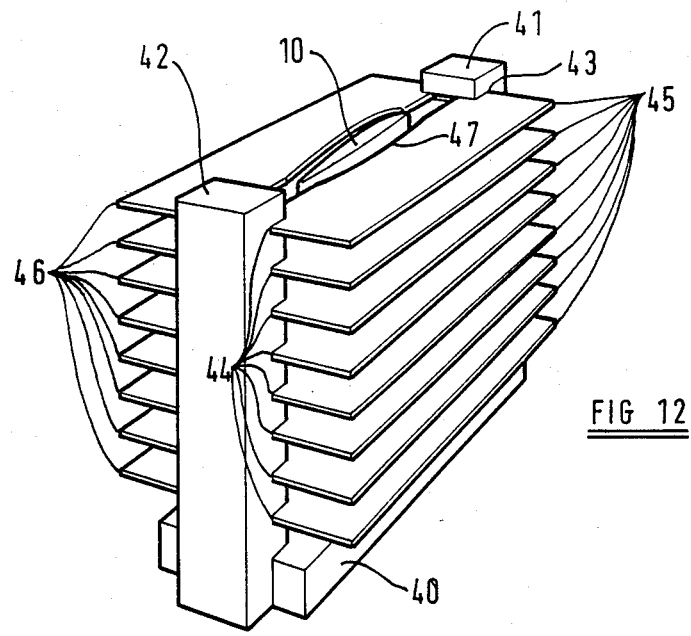
FIG. 12 is a perspective view of a gauge apparatus.
Figure 13:
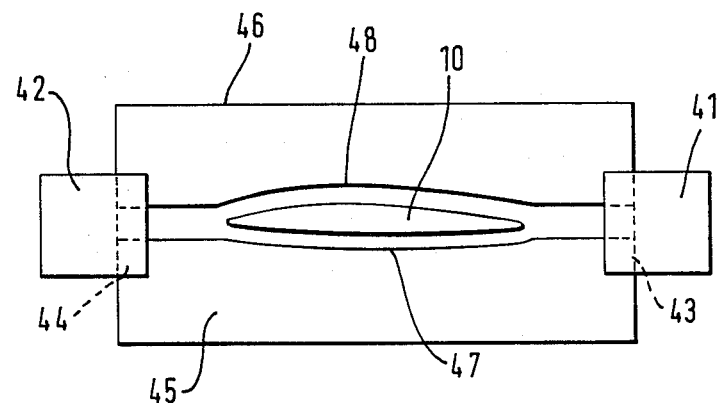
FIG. 13 is a plan view of the gauge apparatus shown in FIG. 12.

After the application of such mechanical forces, the blade is subjected to heat treatment, for example as in the oven 60 shown in FIG. 11, and then the form and shape of the blade may be checked by a gauge such as that shown in FIGS. 12 and 13.

The gauge shown in FIGS. 12 and 13 comprises a base member 40 having a pair of upwardly extending support members 41 and 42, each of the members 41 and 42 being provided with horizontally aligned slots 43 and 44 respectively.

Extending between and located in each pair of horizontally opposed slots 43 and 44 are a pair of gauge members 45 and 46. Each of the gauge members 45 and 46 which comprise metal plates have a cut-out 47 and 48 respectively which corresponds to half the desired cross-sectional profile of the turbine blade 10 at a distance from the base member 40 determined by the distance from the base of the respective horizontally opposed channels 42 and 43.

In order to check if the turbine blade 10 is of the correct form and shape, it is carefully positioned on the base member 40 and the gauge plates 45 and 46 inserted into their respective channels 42 and 43 and moved into contact with the turbine blade 10. If the gauge plates 45 and 46 do not fit around the turbine blade perfectly, i.e. there is a gap at any position between a gauge plate and the turbine blade, either the form or shape of the blade requires some correction, the form being corrected by imparting a twisting force to the blade as aforedescribed, and the shape being corrected by the addition or removal of material by welding or grinding respect-ively for example.

After heat treatment the lacing wire holes 13 and 14 are reformed, for example by drilling. However, in normal circumstances the lacing wire holes will not be reformed until the turbine blade has been gauged and found correct in form and shape, since if it is not correct and further re-shaping and re-forming is necessary.

Once again the turbine blade 10 will be subjected to heat treatment and if the form and shape is not correct, it will be subjected to mechanical forces to twist the turbine blade to the correct form and/or machining, after which heat treatment will follow and the cycle of application of mechanical forces, heat treatment and measuring by the gauge will be continued until the gauged turbine blade is found to be correct.

The description of the method of the present invention describes each of the steps involved in the method of repair. However it will be appreciated that the apparatus illustrated, for example that for applying mechanical forces to the blade to cause twisting thereof to return the turbine blade to its correct form, and the heat treatment oven, may be replaced by other methods of applying a twisting or bending force to the blade and other forms of heat treatment may be provided so long as they heat the blade sufficiently to cause relief of any residual stress.

I claim:

1. A method of repairing a solid turbine blade of the type having one or more lacing wire holes, the method comprising the steps of:
    (a) welding additional metal to a part of the blade requiring repair;
    (b) eliminating each lacing wire hole by completely filling the hole or holes with material the same as or at least compatible with the material from which the blade is made;
    (c) subjecting the blade to a stress relieving heat treatment process to relieve residual stress in the blade, said heat treatment step being performed after said lacing wire hole or holes are filled so that the build-up of residual stresses in the area of each lacing wire hole as a result of the heat treatment is minimized;
    (d) machining the repaired area of the blade to return it to its original shape.

2. The method as claimed in claim 1 comprising the additional step of subjecting the turbine blade to mechanical forces to restore it to its original form, which step is carried out after the filling of the lacing wire hole or holes and before subjecting the blade to said heat treatment process.

3. The method as claimed in claim 1 or claim 2 comprising the further step of gauging the turbine blade prior to the heat treatment process.

4. The method as claimed in claim 1 or claim 2 wherein said repair includes the step of removing a part of the turbine blade which has been damaged or eroded and welding a new piece of material thereto.

5. The method as claimed in claim 1 or claim 2 wherein the repair includes the step of adding metal to the turbine blade in fused form by a welding process.

6. The method as claimed in claim 1 or claim 2 wherein each lacing wire hole is filled by a solid piece of material which is welded therein.

7. The method as claimed in claim 1 or claim 2 wherein each lacing wire hole is filled by the metal in a fused condition by a welding process.

8. A method of repairing a solid turbine blade of the type having one or more lacing wire holes, the method comprising the steps of:
    (a) welding additional metal to an eroded or damaged part of the blade;
    (b) filling each lacing wire hole completely with a metal the same as or compatible with the metal from which the turbine blade is made;

(c) gauging the blade to ascertain if it is of the correct form;
(d) applying mechanical forces to the blade to return it to its correct form if correction is necessary;
(e) subjecting the blade to a heat treatment process to relieve residual stress, said heat treatment step being performed after said lacing wire hole or holes are filled so that the build up of residual stresses in the area of each lacing wire hole as a result of the heat treatment is minimized;
(f) machining the blade to return it to its correct shape;
(g) reforming the lacing wire hole or holes.

* * * * *